Oct. 26, 1965 W. C. GEIGER, JR 3,214,177

ROTARY TURNTABLE SUPPORT MEANS

Filed July 11, 1961

INVENTOR.
William C. Geiger Jr.

BY

Peck & Peck
Attorneys

United States Patent Office 3,214,177
Patented Oct. 26, 1965

3,214,177

ROTARY TURNTABLE SUPPORT MEANS

William C. Geiger, Jr., 6406 N. 5th St., Philadelphia, Pa.

Filed July 11, 1961, Ser. No. 123,250
2 Claims. (Cl. 274—39)

This invention relates to improvements in rotary turntable support means, which are used for supporting, and for permitting rotation of, rotary turntables for the purpose of rotating disk records thereon, for playing the records by conventional pickup arm means which are equipped with conventional sound pickup means. More particularly it is primarily concerned with a rotary turntable support means for a precision machined rotary turntable for playing disk records, but may be used with any rotary turntable for playing disk records with definite advantage.

Heretofore, the rotary turntable support means of practically all commercially available precision machined turntables utilized a precision machined, vertically pendant, round shaft on the underside of the turntable, which pendant shaft was concentric with the axis of turntable rotation, and which pendant shaft was also inserted in, and supported by, a precision machined sleeve-type plain bearing, which sleeve-type plain bearing was closed at the bottom and mounted vertically on a horizontal mounting plate. The sleeve itself of the plain bearing served as lateral support and stability for the rotary turntable during rotation thereof, and usually a single steel ball, resting on said closed bottom of the sleeve, served, in sliding-type friction, as vertical support for the rotary turntable during rotation thereof.

Such vertical sleeve-type plain bearings, prior to this invention, were utilized for practically all precision-type machined turntables, and definitely imposed solely sliding-type friction, which very high coefficient of sliding-type friction, being substantially one hundred times greater than the rolling-type coefficient of friction obtained from ball-type bearings, is quite prone to cause significant chatter and vibration in a rotary turntable system.

Moreover, another problem, imposed by these vertically mounted plain-bearings, was inevitable, in preventing the extremely small amount of lubricant which was usuable from gradually being deteriorated, dried out, or drained, because of gravity, from the extremely small, clearance (sometimes less than one thousandth of an inch to obtain precision rotation) between the vertical pendant shaft and its cooperating sleeve bearing, whereby, metal to metal contact of the relatively long shaft and relatively long sleeve could readily take place to impose additional rumble vibrations in the reproduced sound.

Furthermore, such a sleeve-type plain-bearing was practically always mounted in rigid, direct, metal to metal, contact with the mounting plate which was used for its support. Consequently, such a sleeve-type plain-bearing was itself virtually undamped, and furthermore said mounting plate, which was frequently relatively large, inevitably was set into vibration by the direct transmission of vibrations from such sleeve-type plain-bearings, and the danger was always present that the mounting plate was, also, even more objectionably, being vibrated at its frequency of resonant vibration, by normal vibrations imposed by said sleeve-type plain-bearing. Obviously, such vibrations of the mounting plate inevitably were transmitted to the sound pickup means via the pickup arm means and/or by the turntable itself to be superimposed with the reproduced sound as turntable rumble vibrations.

It is pointed out that even vibrations of exceedingly small magnitude imposed by a bearing means, or by a bearing mounting plate, which can be transmitted to reach the sound pickup means are then enormously, amplified by modern, extremely high gain, wide frequency range amplifiers and superimposed with the reproduced sound as turntable rumble sound vibrations which rumble vibrations modulate with, and hence impair the clarity of, the reproduced sound and are in themselves extremely disturbing to the listener.

The chief object of this invention is to overcome all the aforesaid drawbacks of the rotary turntable support means as heretofore constructed, by maintaining, indefinitely, exceptionally low turntable rumble vibrations, due to an improved rotary turntable support means, by providing the following: a rotary turntable support means which utilizes the extremely low rolling-type coefficient of friction of a horizontally mounted, ball-type, thrust-type anti-friction bearing, which bearing, although even normally, inherently offering superior oil retention properties over said vertical sleeve-type plain-bearing, further includes novel, positive oil retention means; and a rotary turntable support means which further provides isolation and damping means, for substantially isolating objectionable vibration of the rotary turntable system, if present, from reaching, and vibrating, the mounting plate of the rotary turntable support means, and for damping any rumble vibrations that may be present in the thrust bearing itself.

Figure 1:
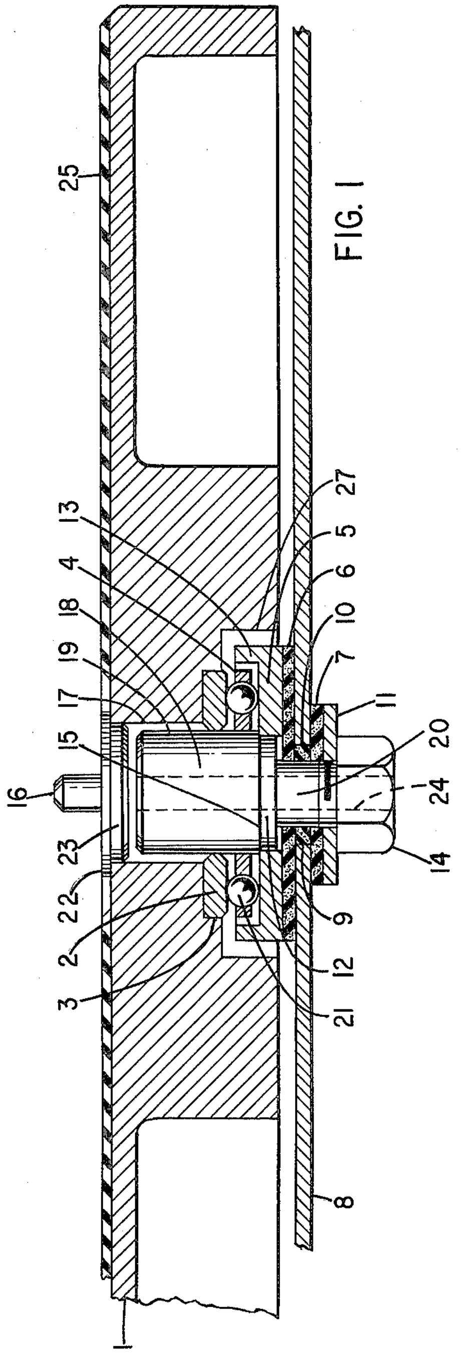
FIG. 1 is a side elevation sectional view of the turntable support means with parts thereof broken away, which shows a ball-type thrust-bearing having flat races, and thus, in view of the flat races, to retain the turntable in its position laterally the very small circumferential area of the inside diameter of the horizontal rotating bearing race which is installed in the turntable is, as shown, in sliding contact with a very small circumferential area of the vertical stationary spindle. Also, shown in FIG. 1 is damping and isolating means which is preferably formed of sponge rubber, although other suitable material may be used, for damping bearing vibration and for isolating it from the mounting plate, as well as a very advantageous lubricant retention means.

Referring more specifically to the drawing, the rotary turntable 1 has installed by means of a force fit, in the counterbored portion 3 thereof, the upper flat race 2 of a ball-type thrust-bearing. On the top surface of the mounting plate 8 in concentric relation to the circular hole 9 in the mounting plate 8 is placed a circular damping washer 6, of sponge rubber or other suitable damping material, which is preferably though not necessarily of the closed cell type (which does not absorb lubricant or moisture). A circular spindle is designated generally by the reference numeral 18, and comprises an upper portion 19 of enlarged diameter, an intermediate portion 12 of reduced diameter, and a lower portion 20 of further reduced diameter. The outside diametral portion of the circular intermediate spindle portion 12 is press-fitted into the hole of the circular lower bearing race 5 so that the shoulder 15 of the spindle 18 rests on the top surface of the bearing race 5. The circular spindle 18 with the bearing race 5 thus affixed thereto, is passed through the hole in the circular damping washer 6 and the hole 9 in the bed plate so that the circular lower bearing race 5, which bearing race 5 has a lubricant retention flange 13 extending upwardly on its outer periphery, rests on top of, and in contact with, the circular damping washer 6. The circular retainer 4, preferably of bronze material because of the effective damping characteristic of bronze, contains the balls 21, which rest on the top surface of the lower bearing race 5 in concentric relation to the spindle 18. A circular damping bushing 10 of sponge rubber or other suitable damping material, preferably though not necessarily of the closed cell type is inserted between the outer periphery of the spindle portion 20 and the inside circumferential surface of the hole 9 in the mounting plate 8 for the purpose of isolating the mounting plate from possible vibration imposed by the thrust bearing assembly, and for locating the spindle 18 relative to the hole 9 in the mounting plate 8. Another circular damping washer 7 of sponge rubber or other suitable damping material, preferably though not necessarily of the closed cell type, is placed in concentric relation with the circular spindle 18 and in contact with the underside of the mounting plate 8. A plain metal circular washer 11 is placed in concentric relation with the circular spindle 18 and in contact with the underside of the damping washer 7. A locking-type nut 14 is attached to the lower threaded end of the spindle portion 20 and is drawn against the washer 11 until the damping washers 6 and 7 are compressed a small amount. The turntable 1, including its attached circular upper bearing race 2 is placed so that its circular bearing race 2 is in contact with and is in concentric relation to the circular spindle 18 and rests on top of the balls 21 of the ball-bearing retainer 4. The rubber mat 25 on the upper surface of the turntable 1 is conventional for placing records upon. The spindle 16 is formed to a flange 22 which flange 22 in turn is formed to a circular portion 23, as shown. The spindle 16 projects upwardly from the flange 22 which flange 22 is circular and rests on the top surface of turntable 1 in concentric relation with the hole 17 formed therein after the circular portion 23 which depends from the flange 22 and is in concentric relation to the spindle 16, is inserted in the hole 17 with a close sliding fit. The spindle 16 thus rotates with the turntable, for use for purely manual playing of records, and is readily removable therefrom. It is to be understood that the turntable 1 may also be so formed that said spindle 16 forms a rigid part thereof. The dotted line 24 is a hole through the center of the stationary spindle 18 for the purpose of being utilized for receiving the spindle in a changing mechanism of an automatic record-changer, when the spindle 16 has been removed from the turntable 1.

Accordingly, from the foregoing, it is evident that the said damping washers 6, 7 and 10 dampen bearing vibrations which may be present and also isolate them from the mounting plate 8.

Also accordingly, it is further evident that the flange 13 extending upwardly on the outer periphery of the lower bearing race 5 together with the seal created at 15 by the press-fit contact made by the vertical spindle 18 with the lower bearing race 5 provides a reservoir for retaining lubricant for the rotative ball-bearings. This structure for retaining lubricant, moreover, enables a somewhat heavy bodied lubricant (which heavy bodied lubricant may contain molybdenum disulphide for providing a relatively low coefficient of friction) to be used, and permanently retained, for, in turn, permanently providing still further vibration damping.

Further accordingly, the major portion of the rotational load which includes the weight of the relatively heavy cast and machined turntable, as well as the stability of it, is supported by means of rolling-type friction via ball-bearings, during rotation thereof. The extremely small contacting circumferential surface between the outside diameter of the spindle 18 and the inside diameter of the upper bearing race 2 which is in sliding-contact, serves only to guide the turntable and prevent the exceedingly light force provided by the turntable rotational means, which force for any system should be exceedingly light, from decentering the turntable with respect to its ball-bearing support means.

Test results of the experimental model embodying this invention in connection with all of the foregoing:

A test record was used for testing for turntable rumble in an experimental model of a turntable which embodied this invention. This test record tested for rumble at 60 db below zero level and provided the most severe test of any test record for testing rumble which was known to be available. This test record required that a tone of 1000 cycles per second, which tone was recorded on this record at 60 db below zero level, be clearly audible above any record surface noise, turntable rumble, or residual hum that may be present, when the volume control on the preamplifier which is being used is sufficiently turned up to the exceptionally high level which is required to hear said tone. The experimental model of the turntable embodying this invention, passed this test while using a stereo sound pickup which was stereo connected for the purpose of receiving both lateral and vertical rumble vibrations from this turntable, and with the bass control of the preamplifier also rotated to its maximum position. The said maximum position of said bass boost control of the preamplifier, according to the manufacturers specification of the preamplifier which was used, amplifies the bass frequencies another 20 db. This additional 20 db bass boost of course can not in any way amplify the 1000 cycles per second test tone, but amplifies only those frequencies in the bass, or low frequency region, down to a frequency as low as 20 cycles per second, which frequency region is the region in which turntable rumble can occur, thus making this test for turntable rumble much more severe, i.e., in effect, 80 db below zero level. Further when the bass control on the preamplifier being used for this test was set for zero bass boost, or for any moderate bass boost, for this test, turntable rumble was practically inaudible. This test was performed with the prescribed RIAA equalization for the test record, using a very wide frequency range stereo sound pickup stereo connected to a wide frequency range, stereo preamplifier, which preamplifier was connected to a 100-watt wide frequency range power amplifier and which power amplifier was in turn connected to a wide frequency range three-way loud speaker system. The frequency response of each of said units was rated virtually flat down to at least 30 cycles per second.

In fact, during all listening tests wherein the usual recorded material was being played with the abovesaid wide frequency range equipment, it was not found possible to discern any turntable rumble whatsoever from the experimental model of the turntable embodying this invention.

The above shows that the novel turntable support means according to this specification provides an improved rotary turntable means with an unusually low rumble content.

In conclusion:

Features disclosed herein may be used with an independent pickup arm means for purely manual record playing, in an automatic record player, or in an automatic record-changer.

While the form of embodiment of the invention as herein disclosed constitutes a particular form, it is to be understood that other forms might be adopted as may come within the scope of the claims which follow.

What is claimed is as follows:

1. A rotary turntable means for rotating disk records for playing by a pickup arm means equipped with a sound pickup, wherein said rotary turntable means includes: a rotary turntable; a first bearing race means substantially in concentric relation to, and in supporting contact with, the rotary turntable; a ball bearing means in supporting and rotative contact with said first bearing race means; a second bearing race means for supporting and permitting rotation of said ball bearing means; a spindle means substantially in concentric relation to, and at substantially a 90-degree angle to, the inside diameter of the first bearing race means, the inside diameter of the ball bearing means and also the inside diameter of the second bearing race means; a mounting plate means; isolation and damping means upon which said second bearing race means is supported, which isolation and damping means is in turn supported by, and isolates, the second bearing race means and the spindle from contact with said mounting plate means; and means for holding said spindle means and said second bearing race means in position with respect to said mounting plate means; whereby, to dampen turntable rumble and to isolate it from the sound pickup.

2. The rotary turntable means in accordance with claim 1, wherein said second bearing race means has lubricant retention means extending upwardly therefrom; whereby a preselected lubricant used for said ball bearing means can be permanently retained to thereby further reduce turntable rumble.

References Cited by the Examiner

UNITED STATES PATENTS

| | | | |
|---|---|---|---|
| 1,746,004 | 2/30 | Marshall | 274—39.1 |
| 1,854,941 | 4/32 | Kiel | 274—39.1 |
| 1,975,907 | 10/34 | Strauss | 274—39.1 |
| 3,058,790 | 10/62 | Hammerand | 274—39 |

FOREIGN PATENTS

| | | |
|---|---|---|
| 844,480 | 8/60 | Great Britain. |

NORTON ANSHER, *Primary Examiner.*

JOHN P. WILDMAN, *Examiner.*